Dec. 19, 1950          D. MURDOCK          2,534,526

ELECTRODE HOLDER

Filed Nov. 13, 1948

INVENTOR.
David Murdock
BY
Wood, Arey, Herron & Evans
ATTORNEYS.

Patented Dec. 19, 1950

2,534,526

UNITED STATES PATENT OFFICE 2,534,526

ELECTRODE HOLDER

David Murdock, Cincinnati, Ohio

Application November 13, 1948, Serial No. 59,954

11 Claims. (Cl. 219—8)

The subject of this invention is arc welding equipment and the invention is particularly directed to an improved electrode holder.

An electrode holder is, in essence, a device establishing electrical communication between the terminal of a welding cable and an electrode. Preferably, it incorporates electrode clamping means which may be manually released or unclamped by the operator to permit the replacement of the old electrode after it has been substantially consumed, or to permit the positioning of the electrode so that it projects from the holder at a convenient angle to the work. In the commercial form, these holders usually comprise a pair of facially opposed, spring-urged jaws electrically connected to the welding cable, an insulating handle loosely surrounding the electrically active parts and a lever, extending laterally through an appropriate opening in the handle, which, when actuated, causes cams, respectively carried at the end of the lever and on the jaws, to slide upon each other, forcing the jaws open.

The exigencies of modern structural fabrication methods require jaw actuating mechanisms which open and close the jaws with a rapid and positive movement to enable the operator to replace or adjust the electrode quickly. Accordingly, recent electrode holder designs have been provided with various types of sliding cams which coact in frictional engagement to force and hold the jaws in an open position. However, these holders do not continue to provide the desired quick opening and closing action over long periods of use because the repeated, sliding, frictional movement of the cam surfaces upon each other rapidly wears away their surfaces. Hence, the jaw opening action becomes sluggish and lethargic with the continued use of the instrument. In some instances, the jaws, cams and springs can be replaced. However, more frequently, the operator discards the entire holder.

It is an object of this invention to provide an electrode holder incorporating a quick, positive camming action in which rolling contact is maintained between the cammed surfaces whereby frictional engagement and, consequently, wear between the surfaces is minimized and the rapid opening and closing action is sustained over long periods of use.

Loss of efficiency in the opening and closing action also occurs because of the tendency of the jaw actuating springs to either lose resiliency or to work loose from their fastenings whereby lost motion occurs during the camming action and the springs are dilatory or fail to respond to cam movement.

An additional purpose of this invention is to reinforce and supplement the compression forces exerted by the springs on the jaws by utilizing the insulating handle as a resilient structural support for the springs. Accordingly, the resilient handle walls bear upon the springs and flex in response to spring movement as the jaws are forced open. Consequently, the handle assists the springs as the jaws are returned to clamping position and constantly exerts a compression force on both springs. While, in the preferred construction, the jaws and springs are integral, and the handle actually supports the spring members, the invention contemplates the support of the jaws by the resilient handle, if desired. Moreover, since even the insulating handle may tend to lose its resiliency over long periods of use, the invention also is based upon the concept of reinforcing the handle by means of a supplementary compression member which flexes with the resilient handle.

The cam actuating lever which projects laterally from the side of the insulating handle is, in many commercial holders, arranged at an awkward angle so that the operator cannot easily extend his grasp over both the electrode holder and the lever. In order to insure positive clamping action, very powerful springs are used in the holder. The operator usually must employ both hands to overcome the resistance of these heavy springs as he moves the lever to open the jaws. In attempts to overcome this difficulty, various holders have been designed in which the cam actuating lever lies close to the insulating sleeve and moves through a very short arc in opening the jaws. Unfortunately, this prevents the operator from grasping the handle firmly without also grasping the cam actuating lever, with the consequent danger of inadvertently grasping the lever too tightly and forcing the jaws open during the welding operation.

This invention provides mechanism for lightly but securely holding the lever in an out of the way position in respect to the hand hold portion of the handle when the welding operation is being performed, thereby permitting the operator to grasp the handle fully and firmly without also moving the lever and opening the jaws. When the operator desires to open the jaws, he simply moves the lever until it assumes a position lying closely alongside of the handle and the cams are brought into engagement. This movement can be accomplished quite easily since the jaw springs do not resist lever movement until the cams are engaged. After the lever has been moved to cam engaging position, the lever and the handle can be comfortably grasped with one hand. Thereafter, the operator can exercize the maximum effective hand grasp on the lever and handle and squeeze the jaws open.

Hence, this invention contemplates a pair of substantially identical spring-urged electrode holding jaws, means for establishing electrical communication between the jaws and a terminal welding cable, a resilient insulating sleeve or handle exerting compression forces on the jaws and capable of being flexed with the jaws as they open and close, a wedge terminating in a lever which extends laterally from an appropriate opening in the handle and roller cams for spreading the jaws upon movement of the lever. The invention, as previously indicated, also contemplates means for moving the lever out of the way of the operator when the lever is not in cam engaging position.

Those skilled in the art will readily appreciate further advantages of my invention from the following description and the drawings in which.

Figure 1:
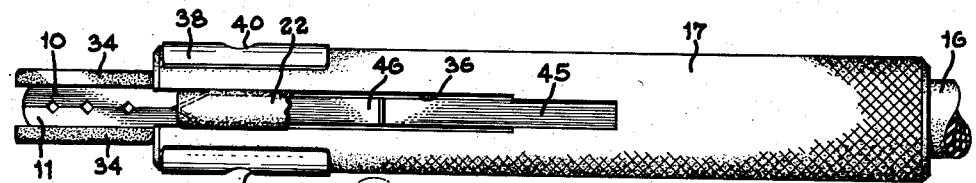
Figure 1 is a top plan view of the improved electrode holder in which the cam actuating handle is broken away.
Figure 2:
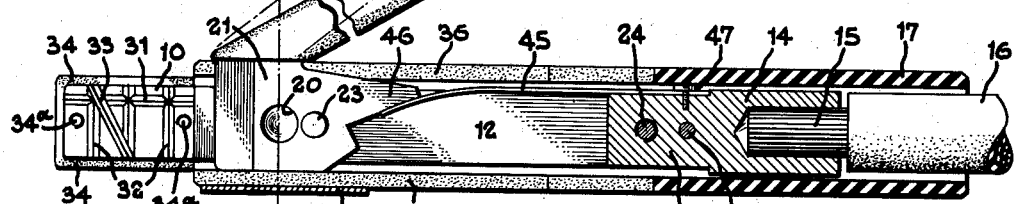
Figure 2 is a vertical section taken along the longitudinal center line of the improved holder in which some of the parts are shown in elevation. In this view the internal members are shown in the position they assume when the jaws are closed.
Figure 3:
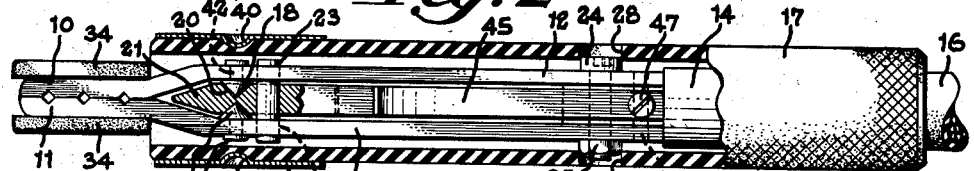
Figure 3 is a top plan view of the electrode holder in which the forward portion of the sleeve is broken away and shown in section in order to fully disclose the arrangement of the members in the interior of the sleeve, when the jaws are in the closed, or clamped, position.
Figure 6:
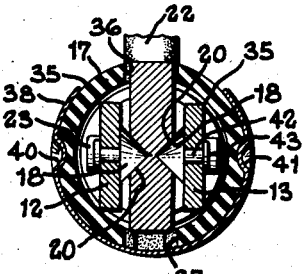
Figure 6 is a sectional view taken along line 6—6 of Figure 2.

The holder in the preferred embodiment shown in Figures 2, 3 and 6, comprises a pair of facially opposed jaws 10 and 11 integrally formed on the ends of flat springs 12 and 13 which are bolted to an adapter 14 soldered to a terminal 15 of a lead or "welding" cable 16. A cylindrical insulating sleeve 17 made of fibre or other suitable resilient insulating material encloses the spring-adapter assembly and serves as an insulated handle for the unit. Conical cams 18, pivotally mounted on the springs 13 and 14, are arranged for rolling contact with mating cam surfaces 20 formed on a pivotally mounted extension 21 of a handle 22. Manual actuation of the handle causes the extension 21 to pivot about a pin 23, thereby causing the cam surfaces 20 to roll the cams 18 outwardly and, consequently, force the springs to diverge. Thus, when the springs are spread, the jaws are opened and the old electrode drops out or can be removed from the jaws and a new electrode may be placed between them.

In the preferred embodiment, spring members 12 and 13 are firmly clamped, by means of a bolt 24 and nut 25, to the opposite faces of a boss 26 projecting forwardly from the adapter. The springs are thus firmly held in spaced parallel relationship but are only clamped at one end, and the other ends are free to diverge outwardly, under tension, as they are wedged apart by the camming action. An aligning pin 27, pressed through holes in the endwise portions of the respective springs and the adapter prevents the springs from becoming misaligned by pivoting about the bolt 24 and serves to hold the springs and adapter in assembled relationship when the assembly is removed from the sleeve. It will be noted that the clamping bolt 24 and nut 25 perform a dual function, serving not only to clamp the springs to the adapter but also to loosely hold the spring assembly within the sleeve. Hence, the overall length of the bolt is purposely dimensioned to exceed the internal diameter of the sleeve and, consequently, the bolt and the nut extend into ports or sockets 28 and 30, formed in the sleeve wall, thus, preventing longitudinal movement of the spring-adapter assembly in relation to the sleeve when the bolt and nut are in the clamping position. The bolt 24 and the nut 25 are inserted through these holes after the spring-adapter assembly is forced into the sleeve.

The forward ends of the springs are configurated so that they converge inwardly and terminate in the parallel jaws 10 and 11. It is desirable to configurate the parts such that the jaws will engage one another facially over their entire areas only when they are held together under pressure. This construction insures positive longitudinal contact with the shank of a welding electrode throughout its length.

Figure 4:
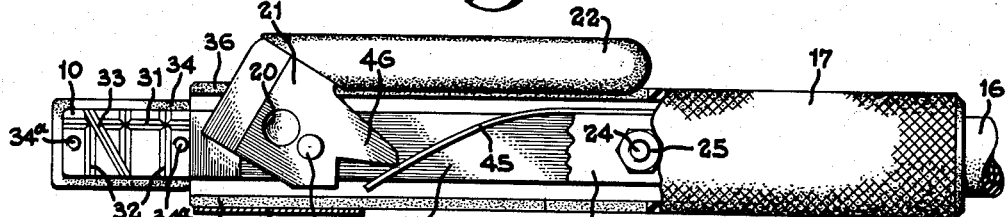
Figure 4 is a vertical plan view of the improved holder with the forward portion of the sleeve broken away to show the arrangement of the internal members when the jaws are cammed to the open position.

To facilitate the grasp of the jaws on the electrode, horizontal and vertical channels 31 and 32 are scored in the respective jaw faces. The vertical channels, or grooves, 32 on one jaw register with the corresponding grooves in the face of the other jaw, thus, defining sockets for the reception of the ends of the pencil-like electrode shanks. It is apparent that electrodes may be inserted in these sockets so that they extend downwardly, or upwardly, in relation to the electrode holder. In addition to the horizontal and vertical grooves, the face of each jaw is scored with at least one obliquely extending groove 33 which, like the horizontal groove 31, does not register with a corresponding groove on the face of the other jaw but abuts the substantially plane surface of the other jaw. When an electrode is inserted within these grooves, the jaws cannot fully close into face to face abutment but the spring tension, nevertheless, firmly holds the electrode in position between the jaws. While in Figures 2 and 4 only the face of jaw 10 can be seen, the face of jaw 11 is substantially the same, the difference being that the obliquely scored channel, instead of extending from the forward portion of the top downwardly to the rear, extends, in jaw 11, from the forward portion of the bottom upwardly to the rear. Moreover, channel 31 extends horizontally across the bottom of jaw 11, while in jaw 10 it extends horizontally across the top. Thus, when the jaw faces are in abutment, the oblique channels cross at approximately their centers and horizontal grooves are provided in both the top and bottoms of the mating jaws.

This arrangement of the grooves presents two distinct advantages. In the first place, the welder can arrange the electrode in four different oblique positions, i. e., the electrode can be placed in the oblique groove of jaw 10 so that it extends upwardly and to the front or downwardly and to the rear. In the alternative, it can be placed in the oblique groove in the face 11 so that it extends downwardly and to the front or upwardly and to the rear. The second advantage arising from this construction is the interchangeability of the jaws. It will be observed that both jaws are identical in construction. One jaw, however, in the assembly is inverted with respect to the other jaw so that when the jaw faces abut, the oblique channels are canted in respect to each other and the horizontal channels are spaced in the respective top and bottom portions of the abutting jaws. Naturally, the identity and, consequently, the interchangeability of the jaws result in reduced manufacturing costs, simplification of replacement and repair, and since there are no right and left jaws, simplifies the order and purchase of the parts.

The back of each jaw is insulated by a pad 34 secured to the jaw by means of screws 34a. The pad may be formed of fibre or any other suitable dielectric material as desired, and is dimensioned to extend marginally upon the periphery of the jaw, thereby protecting the jaw from external contacts and preventing a "short" between the electrically active jaw and any conductor upon which the jaw may be carelessly laid. Very often, an operator will carelessly lay the electrode holder upon the work without first breaking the circuit. When this happens, the high difference in potential causes sparking between the work and the jaw, resulting in the burning of the jaw, or the work, or both. In the present invention, the insulating pads preclude the possibility of such an accident occurring.

The effectiveness of the jaw clamping action is not, in this invention, solely dependent upon the configuration of the springs or upon the mechanical efficiency of the spring clamping bolt 24, for the fibre sleeve or handle is especially designed to not only insulate the electrical conducting members but to structurally supplement the clamping forces and constantly exerts inward pressure on the spring members 12 and 13.

As best seen in Figure 6, the inside diameter of the sleeve is so dimensioned that the inner wall surfaces contact and evenly embrace the outside corners 35 of the jaw springs, thereby insuring positive clamping action. To permit the jaws to diverge as the cams spread them outwardly, two diametrically opposed, longitudinal slots 36 and 37 are cut, or formed, in the forward portion of the top and bottom sleeve walls, thereby permitting the side walls of the sleeve to spread outwardly in response to lateral pressure exerted by the springs. These slots are not of uniform width throughout their length, being narrowed near the central portion of the sleeve whereby the resiliency of the sleeve is less pronounced in the central portion than at the end, thereby assuring a gradual bending effect of the side walls. When the electrode has been replaced and the jaws are restored to clamping position, the natural resiliency of the fibre sleeve returns the side walls to their normal position.

Since the fibre may tend to lose its inherent resiliency as the side walls are continuously flexed, a clamping ring 38, preferably made of spring steel, is fitted over the forward portion of the sleeve in an area covering the maximum point of divergence of the springs. Any convenient means may be used for joining the clip to the sleeve but in the preferred embodiment the clip is slid over the sleeve and then punched in position, as at 40 and 41. It will be seen that the clip sides flex with the diverging side walls of the sleeve, reinforcing them and adding to the compression forces exerted on the jaw springs. Moreover, the sleeve covers and protects the opening formed by the slot 37 in the bottom of the sleeve. This protection is particularly important where "up welding" is being performed and the sleeve is held in an inverted position. Usually, "splatter" falls from the electrode tip and, if the slot 37 were left unprotected, hot metal would enter the interior of the sleeve through the slot, thereafter hardening and locking the cam mechanism. It will be noted that, although the sleeve is made of metal, it is very carefully insulated by the sleeve and the operator can grasp it with complete safety.

In essence, the jaw spreading mechanism consists of a pair of roller cams pivotally journalled in, and projecting laterally from, the springs and a wedge capable of being driven into relative rolling engagement with the roller cams, causing them to move laterally and force the jaws apart. In the preferred embodiment, the cams are in the form of cone-shaped rollers having integral studs, or journals, 42 which project through and turn freely in sockets or holes formed in the springs. If desired, the stud ends may be upset to form caps 43 which hold the cams in place. The spreading or forcing wedge consists of a pair of cam surfaces in the form of conical seats 20 on an extension 21 of the lever 22. This lever, which is completely covered by an insulating composition, and the extension are pivoted on a pin 23 which protrudes laterally in both directions from the extension and is journalled in holes 44 formed in the springs. These holes are over-sized and the pivot pin 23 projects a small distance beyond the outside of the springs, thereby permitting the springs to slide outwardly without binding and without becoming disconnected from the pin. It will be observed that the cams are spaced on the springs a short distance from the axis of the pivot pin and (in the embodiment shown in Figures 1 through 6), when the jaws are closed, are fully seated in the cam seats 20 of the handle extension which are also spaced from the axis of the pivot pin (see Figures 2 and 3).

When the operator desires to open the jaws, he simply grasps the lever 22 which extends through the slot 36 and pivots it downwardly and to the rear about the pin 23 until the handle is recessed in the slot 36. The lever extension bearing the conical seats also revolves about this pin and the seats move in a circular arc about the pivot. Since the cams 18 are fixed to the spring and cannot move with the seats, they will roll upon the side walls of the seats, sliding laterally outward and forcing the springs to diverge and the jaws to open.

It will be observed that the relative rolling engagement between the cams and the seat materially reduces the sliding friction and, consequently, minimizes the wear between the parts. Since the contact between each cam and its seat is always linear, and the contacting surfaces are constantly changing, due to the rotation of the cams, the wear between the surfaces is not only materially reduced but evenly distributed over the mating parts. The naturally rapid jaw-opening action is thus maintained over long periods of use, since there is relatively little or no wear between the engaging parts and quick wedging contact is maintained for a sustained period of time.

Figure 5:
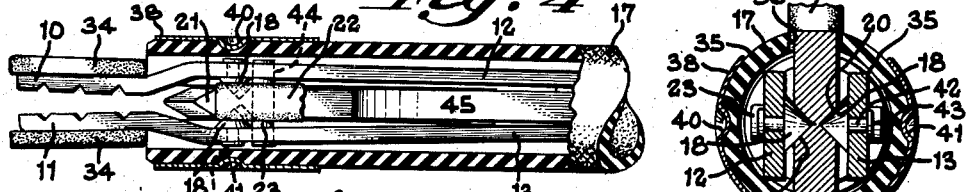
Figure 5 is a top plan view of the holder with the forward, upper portion of the sleeve broken away to show the arrangement of the parts when the jaws are cammed to the open position.

Figure 5 shows the relative position of the cams and the cam seats in the embodiment of Figures 1 through 6 when the jaws are open. As long as the operator holds the handle down in the position shown in Figure 4, the jaws will remain open and the old electrode may be removed and a new one inserted between the jaws. When the operator desires to close the jaws, he simply releases the handle and the springs 12 and 13 drive the cams home, permitting them to roll back into full engagement with their seats and allowing the jaws to clamp the electrode.

If an electrode is inserted between the jaws in such a manner that the jaws are prevented from completely closing the springs 12 and 13 will be unable to completely seat the cams and "play" will exist between the cam seats and the cams. When this condition occurs, a flexed, flat spring 45 bearing on a toe 46 of the lever extension will force the extension and the lever to continue to pivot about the pin 23 until the lever is driven as far as it can go (as shown by the dotted lines in Figure 2). The spring 45 may be located in any convenient place in the assembly but, in the preferred embodiment, it is secured to the top of the adapter 29 by means of a screw 47. It will be noted that, when the jaws are closed, the extension 21 extends between the springs almost to the jaws and effectively prevents "splatter" or hot metal from entering the sleeve and fouling the camming mechanism.

Figure 7:
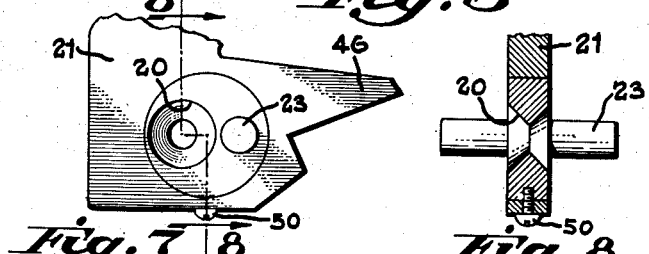
Figure 7 is a vertical plan view of another embodiment of the cam-actuating lever extension.
Figure 8:
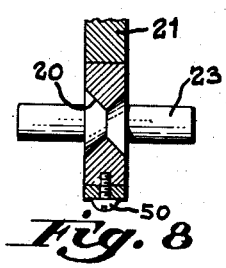
Figure 8 is a sectional view taken along line 8—8 of Figure 7.

In the modification shown in Figures 7 and 8, the cam seats are purposely oversized so the seats do not contact the cams until after the lever has been moved through a substantial arc and lies closely adjacent the insulating sleeve. No camming action occurs during this movement because the oversized cam seats, in pivoting about the pin, do not contact the cams and begin to move them until the lever closely parallels the sleeve. The only resistance which must be overcome by the operator as he turns the lever through this arc is the opposition of the spring 45 which is constantly urging the lever toward an extended position. When the seats do contact the cams, the cams roll upon the seats and the springs are forced outwardly in much the same manner as described before. When this construction is used, the operator, while maintaining a firm grasp on the insulating sleeve, may reach upwardly with his thumb or finger and move the lever in an arc quite easily until the seats engage the cams. Thereupon, he may firmly grasp both the lever and the handle with one hand utilizing his maximum effective grasp to accomplish the camming action against the more powerful resistance of the springs 12 and 13.

In Figures 7 and 8, the cam seats and the pivot pin 23 are shown formed in a hardened steel insert which is recessed in the lever extension, being maintained in position by a screw 50. This expedient is utilized when it is desired to form the springs and the lever from aluminum to lighten the holder. Naturally, the precise construction of the cam seats in no way affects the use of the insert and the insert may be employed in either embodiment shown.

While, in the embodiments shown, the rolling cams are journalled on the springs and the cam seats are formed in the handle extension, it is obvious that the relative positions can be exchanged; i. e., by pivotally journalling the roller cams on the handle extension and forming cam surfaces, or sockets, in the springs in substantially the same manner as shown.

The term "roller cams," as used in this specification, is intended to include the conical configurations shown in the drawings as well as rounded, or ball, elements of similar function but different shape.

Having described my invention, I claim:

1. An electrode holder comprising a pair of resiliently movable conducting jaws for holding an electrode, conical roller cams, one for each jaw, journalled in and fixed to the jaws respectively and projecting laterally therefrom, a wedge capable of being driven into relative rolling engagement with said cams and means for alternately forcing said wedge into and out of coactive engagement with said cams, whereby said jaws are opened and closed in unison.

2. An electrode holder comprising a pair of resiliently movable conducting jaw elements for holding an electrode, a wedge element, conical roller cams, one for each jaw, conical cam seats for said cams, each of said cams and cam seats being fixed in one of the elements and means for moving said wedge element to cause said cam seats and roller cams to be forced into and out of coactive rolling engagement, thereby opening and closing said jaws in unison.

3. An electrode holder comprising a pair of movable conducting jaws for holding an electrode, said jaws being separable from closed to open position, an insulated resilient handle supporting at least one of said jaws and urging said jaws into closed position and means for separating said jaws to open position against the resistance of said handle.

4. An electrode holder comprising a pair of conducting jaws for holding an electrode, said jaws being separable from closed to open position, an insulated handle supporting said jaws, a spring fixed to and supporting said handle and compressing said handle against said jaws and means for separating said jaws to open position against the resistance of said spring.

5. An electrode holder comprising a pair of conducting jaws for holding an electrode, said jaws being movable into closed and open positions, a handle for said jaws, said handle comprising a resilient insulated sleeve having spaced slots extending longitudinally of said sleeve, said slots separating said sleeve into two independently flexible side walls, said side walls bearing upon said jaws and urging them into closed position and means for separating said jaws against the resistance of said side walls.

6. An electrode holder comprising a pair of conducting jaws for holding an electrode, said jaws being movable into closed and open positions, a handle for said jaws, said handle comprising an insulated sleeve having spaced slots extending longitudinally of said sleeve, said slots separating said sleeve into independently flexible side walls, a flexible compression spring extending substantially peripherally around said sleeve and fixed to said side walls and means for separating said jaws against the resistance of said spring.

7. An electrode holder comprising; a tubular handle of resilient material, not conductive to electricity, said handle bifurcated at its forward end to provide two opposing jaw enclosing walls, a jaw disposed against each of the opposing walls, a spring on the outside of said opposing walls urging them together, and a movable wedge adapted to separate the jaws.

8. An electrode holder comprising a pair of jaws for holding an electrode, said jaws being movable into open and closed position, a spring arm for each of said jaws, said arms resiliently cooperable to urge said jaws into closed position, a conical cam for each of said jaws rotatably journalled in one of said spring arms and extending laterally inward therefrom, a wedge, pivot means for mounting said wedge on said spring arms, said wedge having conical cam seats for mating engagement with said conical cams and spaced from said pivot means and means for arcuately moving said wedge about said pivot whereby said cam seats move in an arc about said pivot and said roller cams are rolled laterally outward upon said cam seats forcing said jaws open.

9. An electrode holder comprising a pair of jaws separable from closed to open position, resilient means urging said jaws into closed position, an insulated sleeve comprising a handle for said jaws, a cam for each of said jaws, a wedge pivotally mounted between said jaws and having cam surfaces adapted for coactive engagement with said cam to force said jaws open, a lever connected to said wedge and projecting laterally of said handle, said lever being arcuately movable from an out-of-the-way position in relation to said handle at which position said cams and cam surfaces are not engaged to a position toward said handle where said cams and cam surfaces are engaged and being further movable toward said handle to cause said cams and cam surfaces to coact to spread said jaws and spring means urging said lever in arcuate movement away from said handle and beyond said cam engaging position to said out-of-the-way position.

10. An electrode holder comprising; a pair of jaws for holding an electrode, each jaw having an attached spring arm, said arms cooperable to resiliently urge said jaws into closed position, a conical cam mounted on each of said spring arms and projecting laterally inward therefrom, a wedge having conical cam seats adapted for coactive engagement with said cams to force said arms apart and said jaws open, each of said arms having an oversized journal hole, a pivot pin fixed through said wedge in spaced relationship to said cam seats, said pin being in relative slidable engagement with said journal holes and dimensioned for engagement with said holes when said arms supporting said jaws are in both open and closed positions and means for arcuately moving said wedge about said pivot, whereby said cams and seats are forced into coactive engagement and said arms are spread outwardly forcing said jaws open while maintaining engagement with said pin.

11. An electrode holder comprising: a pair of jaws for holding an electrode, said jaws being movable into open and closed position, a spring arm for each of said jaws, said arms being resiliently cooperable to urge said jaws into closed position, a tubular insulated handle at least partially enclosing said spring arms, a conical cam for each of said jaws rotatably mounted in one of said spring arms and extending laterally inward therefrom, a wedge, pivot means for mounting said wedge on said spring arms, said wedge having oversized conical cam seats adapted to receive said conical cams loosely therein, a lever connected to said wedge for arcuately moving said wedge about said pivot and causing said cam seats to engage said cams and force said springs toward open position, a spring for urging said lever to an out-of-the-way position in relation to said handle at which position said cams are located substantially centrally in relation to said oversized cam seats, whereby as said lever is moved towards said handle, said cam seats do not contact and actuate said cams until said lever is within convenient hand grasp of said handle.

DAVID MURDOCK.

REFERENCES CITED

The following references are of record in the file of this patent:

UNITED STATES PATENTS

| Number | Name | Date |
|---|---|---|
| 1,546,410 | Schneider | July 21, 1925 |
| 1,910,973 | Tisza et al. | May 23, 1933 |
| 2,200,947 | Bourque | May 14, 1940 |
| 2,251,779 | Bourque | Aug. 5, 1941 |
| 2,324,320 | Pelton | July 13, 1943 |